Aug. 31, 1937.　　　G. H. TILLINGHAST　　　2,091,893
EEL HOLDER
Filed May 11, 1936
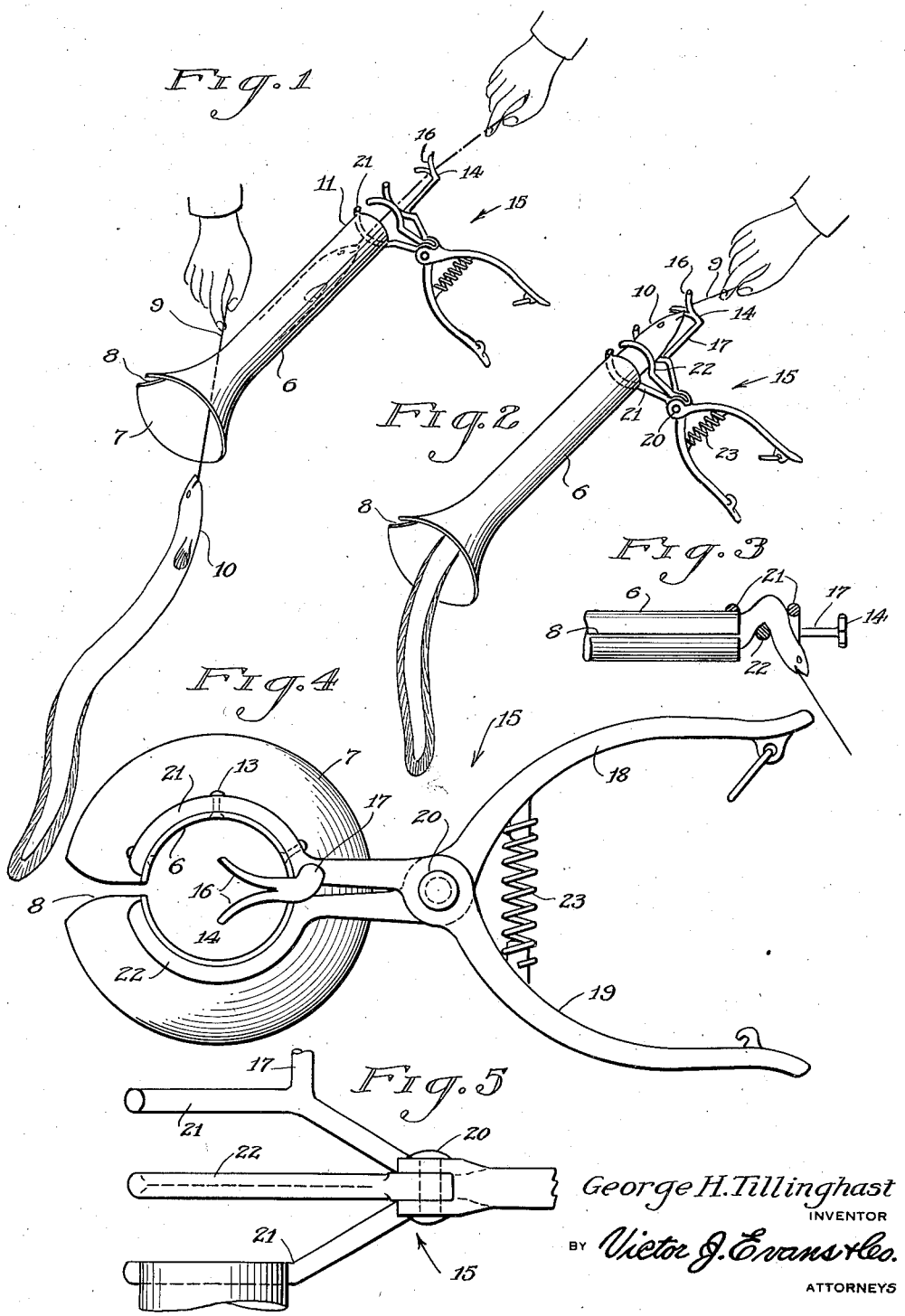
George H. Tillinghast
INVENTOR
BY Victor J. Evans & Co.
ATTORNEYS Patented Aug. 31, 1937

2,091,893

UNITED STATES PATENT OFFICE 2,091,893

EEL HOLDER

George H. Tillinghast, Burlington, N. J.

Application May 11, 1936, Serial No. 79,156

5 Claims. (Cl. 43—29)

REISSUED FEB 27 1940

The present invention relates to a new and improved holder and finds its greatest use in the holding of fish and more especially eels for the purpose of dislodging the hook from the same.

The primary object of the invention is the provision of a holder adapted to receive a fish of the eel type so as to facilitate the removal of the hook from a struggling, freshly caught eel.

A still further object of the invention resides in the provision of a holder which permits the removal of a hook from a fish, eel or the like without contact or injury to the hand, which often occurs with a struggling fish or eel.

The invention will be fully and comprehensively understood from a consideration of the following detailed description when read in connection with the accompanying drawing which forms part of the application.

In the drawing:

Fig. 1 is a perspective view of the new and improved eel holder and illustrating its use.

Fig. 2 is a perspective view of the holder and illustrating an eel completely encased therein.

Fig. 3 is a fragmentary elevational view, partly in section, and disclosing the position of the head of the eel when removing a hook.

Fig. 4 is a front elevational view of the holder and illustrating particularly the clamping means; and Fig. 5 is a fragmentary top elevational view of one end of the holder.

Referring to the drawing for a more detailed description thereof, the invention comprises a tube 6 having one end thereof bell-shaped, as indicated at 7, and a slot 8 extending thruout the entire length of the tube 6. The slot 8 serves as a guide for the line 9 having an eel or the like 10 caught thereon.

Fixedly secured to the forward end 11 of the tube 6 by means of an arm riveted or otherwise secured as at 13 to said tube is a forked member 14 and pliers 15 for the purpose of holding the head of the eel so as to remove the hook. The member 14 has a pair of arms 16 diverging to the shape of a Y and extending therefrom is a longitudinal arm 17 integral with or attached to the pliers 15. As illustrated in Fig. 2 of the drawing, the head of the eel will be projected thru the tube 6 until it abuts the member 14.

The pliers 15 are composed of two sections 18 and 19 pivotally connected at 20. The section 19 has extending therefrom a pair of tongs 21, which tongs are suitably spaced and of the curvature as indicated in the drawing. The section 18 has extending therefrom a single tong 22 curved in a direction oppositte to the tongs 21 and positioned substantially centrally thereof, as better illustrated in Figs. 3 and 5 of the drawing. It will be noted that the arrangement of the tongs 21 and 22 provides a substantially cylindrical opening thru which the head portion of the fish or eel is threaded. Compressing the sections 18 and 19 of the pliers 15 will compress the neck of the eel and tend to cause an opening of its jaws so that the hook lodged therein may be readily removed. A further compression of the sections 18 and 19 will serve to kill the eel instantly since the neck will be broken. A tension spring 23 may be provided attached to the sections 18 and 19 for returning the same to normal position upon release of pressure thereon.

From the above description, the operation of the device is readily apparent. A struggling eel is drawn from the water and the line supporting the eel is grasped in the right hand a few inches above the head of the eel. The pliers 15 are held in the left hand with the split tube 6 held in a downward position, as illustrated in Figs. 1 and 2 of the drawing. The line directly below the finger tips is positioned within the slot 8 at the outer bell-shaped end 7 and said line is moved toward the opposite ends of the tube, whereupon the eel will be drawn into the tube. As soon as the head of the eel has reached the end 11 of the tube, the line 9 is lowered within the jaws of the pliers and forked member 14 and drawn forwardly until the head of the eel abuts the forked member 14, whereupon the tongs 21 and 22 are closed with sufficient pressure to securely hold the eel while the hook is being removed. In this connection it is noticeable that the tongs 21 remain substantially stationary and the tong 22 is movable thru and past the double or fixed prongs. If it is desired to kill the eel more pressure is applied and the tongs completely closed, thereby breaking the eel's neck and causing instant death. This position of the pliers is illustrated in Fig. 3 of the drawing.

It will be readily understood that the use of the present invention permits the disengagement of a hook from the mouth of a fish, eel, or the like, without the hands of the fisherman coming in direct contact with the fish and also alleviates the possibility of the entanglement of a fishing line which often occurs when an eel is hooked thereon.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. A device of the character described comprising a tube having a longitudinal slot therein, pivoted members disposed at one end of said tube and an upright guard member adjacent said pivoted members.

2. A device of the character described comprising a body having a longitudinal bore therein, a longitudinal slot in the side of said body, a pair of pivoted members attached to one end of said body, said members including prong shaped fingers, and an upright guard member integral with said pivoted members.

3. A device of the character described comprising a body having a longitudinal bore therein, a longitudinal slot in the side of said body, one end of said body being bell shaped and the other end supporting a pair of pivoted tongs and an upright guard member integral with said pivoted tongs.

4. A device of the character described comprising a body having a longitudinal bore therein, a longitudinal slot in the side of said body, and a pair of pivoted members attached to one end of said body, said members being formed with interengaging prong-shaped fingers.

5. A device of the character described comprising a body having a longitudinal bore therein, a longitudinal slot in the side of said body, one end of said body being bell-shaped and the other end supporting a pair of pivoted members, said members including prong-shaped fingers actuated by said members.

GEORGE H. TILLINGHAST.